US005485748A

United States Patent [19]
Zeamer

[11] Patent Number: 5,485,748
[45] Date of Patent: Jan. 23, 1996

[54] MAGNETICALLY LEVITATED FORCE/WEIGHT MEASUREMENT SYSTEM

[76] Inventor: Geoffrey H. Zeamer, 583 Winter St., Holliston, Mass. 01746

[21] Appl. No.: 187,626

[22] Filed: Jan. 26, 1994

[51] Int. Cl.$^6$ .................................................. G01P 15/00
[52] U.S. Cl. ...................................... 73/862.61; 310/90.5
[58] Field of Search ........................... 73/517 R, 516 R, 73/517 A, 517 B, 862.69, 862.61; 177/210 R, DIG. 5, 210 EM, 212; 310/90.5

[56] References Cited

U.S. PATENT DOCUMENTS

| | | | |
|---|---|---|---|
| 4,644,205 | 2/1987 | Sudo et al. | 310/90.5 |
| 4,706,498 | 11/1987 | Nemnich et al. | 73/516 R |
| 4,821,423 | 4/1989 | Adams | 73/517 R |
| 4,843,877 | 7/1989 | Kushida et al. | 73/516 R |
| 4,845,988 | 7/1989 | Russell et al. | 73/516 R |
| 4,905,517 | 3/1990 | Crowe et al. | 73/516 R |
| 4,922,753 | 5/1990 | Idogaki et al. | 73/516 R |
| 5,007,292 | 4/1991 | Crowe et al. | 73/516 R |
| 5,168,183 | 12/1992 | Whitehead | 318/90.5 |
| 5,218,257 | 6/1993 | Tozoni | 310/90.5 |
| 5,319,275 | 6/1994 | Tozoni | 310/90.5 |

OTHER PUBLICATIONS

Patent Abstracts of Japan, vol. 8, No. 159 (P–289) [1596] Jul. 24, 1984.
Patent Abstracts of Japan, vol. 9, No. 9 (P–327) [1732] Jan. 16, 1985.
Messen & Prufen, vol. 28, No. 6, Jun. 1992 Munchen (DE), pp. 56–60, "Wagung unter hohen Drucken,".
"IEEE Transactions on Instrumentation and Measurement," vol. IM–31, Dec. 1982, No. 4, New York, USA, pp. 281–283.
European Patent Application No. 84302613.9 dated Apr. 17, 1984.
French Publication No. 2 657 431.
German Publication No. DE 3313333.

*Primary Examiner*—Richard Chilcot
*Assistant Examiner*—Elizabeth L. Dougherty

[57] ABSTRACT

A magnetically levitated force/weight measurement apparatus includes a system core with a plurality of layered circular segments having apertures that define an internal chamber. The segments include, inter alia, upper and lower magnetic bearing segments, a coil segment and an optical detector segment, each of which cooperate to generate magnetic fields for levitating a mass disposed within the chamber. Levitation magnets, rigidly disposed within the mass along a center axis, are arranged such that similar poles are in facing relation. This novel arrangement generates a static magnetic field that radiates orthogonally and symmetrically from the mass and generates a force vector for levitating the mass along the center axis. Bearing magnets, disposed within the magnetic bearing segments, i.e., core bearing magnets, and the spool, i.e., spool bearing magnets, are also arranged such that the polar axes of the core bearing magnets are aligned in the same direction as the polar axes of their corresponding spool bearing magnets. A self-dampening optical and current feedback system ensures that, upon displacement of the spool along the center axis, the spool returns to a stable equilibrium position.

11 Claims, 4 Drawing Sheets

MAGNETICALLY LEVITATED FORCE/WEIGHT MEASUREMENT SYSTEM

FIELD OF THE INVENTION

This invention relates generally to the field of measurement and, more specifically, to a system for precisely measuring force, weight and acceleration vector quantities.

BACKGROUND OF THE INVENTION

One example of a known measuring device that can detect force quantities is a mechanical strain gauge, which typically comprises a diaphragm, wire or spring assembly that reacts to an applied force. Another example of such a measuring device is a D'Arsonval meter movement comprising a wire coil attached to a shaft which pivots on two jewel bearings. The coil typically rotates between two magnetic pole pieces that cooperate to create a magnetic field. When current is applied to the suspended coil, a resulting torque causes the coil to rotate against a torsion spring. The meter movement indicates this current by displaying the mechanical displacement on a calibrated scale.

However, in both of the devices, mechanical contact is required between the measuring apparatus and the measured quantity, i.e., the "outside world", thus obviating their use in applications requiring isolation of measured quantities, such as certain gas and particle measurement applications.

Accordingly, it is among the objects of the present invention to provide a system for measuring force vector quantities requiring complete isolation from external events.

Another object of the present invention is to provide a system for measuring vector quantities without the use of physical bearings.

Yet another object of the invention is to provide a magnetically-levitated system for measuring vector quantities that exhibits low energy consumption and increased efficiency.

SUMMARY OF THE INVENTION

The invention resides in a magnetically-levitated force/weight measurement system having a system core configured to levitate a mass in stable equilibrium, thereby enabling complete isolation of the mass. The system core comprises a plurality of layered circular segments, each of which has an aperture at its center, so as to define a cylinder having an internal chamber. The segments include, inter alia, upper and lower magnetic bearing segments, a coil segment containing solenoid coils and an optical detector segment, which cooperate to generate magnetic fields for levitating the mass disposed within the chamber.

In the preferred embodiment of the invention, the mass is a spool preferably composed of coaxial members having magnets rigidly disposed along a center axis thereof. These magnets are preferably arranged so that similar poles are in facing relation; this novel arrangement generates strong, static magnetic "side" fields that radiate outwardly and symmetrically from the spool. These side fields, in turn, generate a force vector along the center axis of the spool. Bearing magnets, rigidly disposed within the magnetic bearing segments, i.e., core bearing magnets, and the spool, i.e., spool bearing magnets, are also arranged such that the polar axes of the core bearing magnets are aligned in the same direction as the polar axes of their corresponding spool bearing magnets to generate side fields that cooperate to stabilize the spool in levitation in a plane transverse to the center axis.

In accordance with the invention, these magnets interact to levitate the spool in stable equilibrium except along the center axis of the spool. Stability along this latter axis is attained through cooperation of the spool magnets and the solenoid coils, the combination of which generates an electromagnetic field to preserve the spool in a central equilibrium position along that axis. This function is similar to that of a servo accelerometer. In addition, a self-dampening optical and current feedback system ensures that, upon displacement of the spool along the center axis, the spool returns to the central equilibrium position, with minimal oscillations about the central position. Preferably, the feedback system operates in conjunction with optical emitters and detectors to indicate displacements of the spool. A groove, disposed around the perimeter of the spool, defines reference points for use by these optical devices when detecting those displacements.

An advantage of the invention is that generation of the static "side" magnetic fields enables robust, low power, normal (room) temperature levitation operations of the system, thus making the system particularly useful for data collection applications in both laboratory and field environments. In addition, the system provides highly precise weight measurements of objects in complete isolation and in any of these environments. The novel magnetic field configuration enables levitation of a mass using low current and minimal feedback adjustments which eliminates vibration and rotation of the levitated mass.

In one embodiment of the invention, the measurement system can be used as a low-cost, high-precision scale for weighing very small masses and for detecting minute variations in the weight of an object. Such variations may occur because of chemical changes when matter is released from the object or from nuclear decay within the object. The variations may also occur as a result of change in an ambient gravitational field. Therefore, in another embodiment of the invention, the novel system may be used as a gravity meter or as an accelerometer.

As noted, the measurement system may be configured as a small, yet durable device for use in field applications outside of laboratory environments without compromising its precise sensitivity. Moreover, the mass does not vibrate or rotate in levitation, unlike prior room-temperature magnetic levitation systems, and does not require large power sources or supporting equipment.

Another advantage of the novel measurement system is that its force-responsive levitated mass may be configured as a cylinder and may be magnetically constrained to be responsive on only a single axis, thus allowing precise measurement of the magnitude of a single selected component of applied acceleration vectors. The system improves upon the prior art by providing a weight-responsive mass which is fully levitated without the use of cryogenics and without detectable vibrations. Stated differently, the illustrative embodiments of the present system do not rely upon the Meisner effect and eddy currents.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
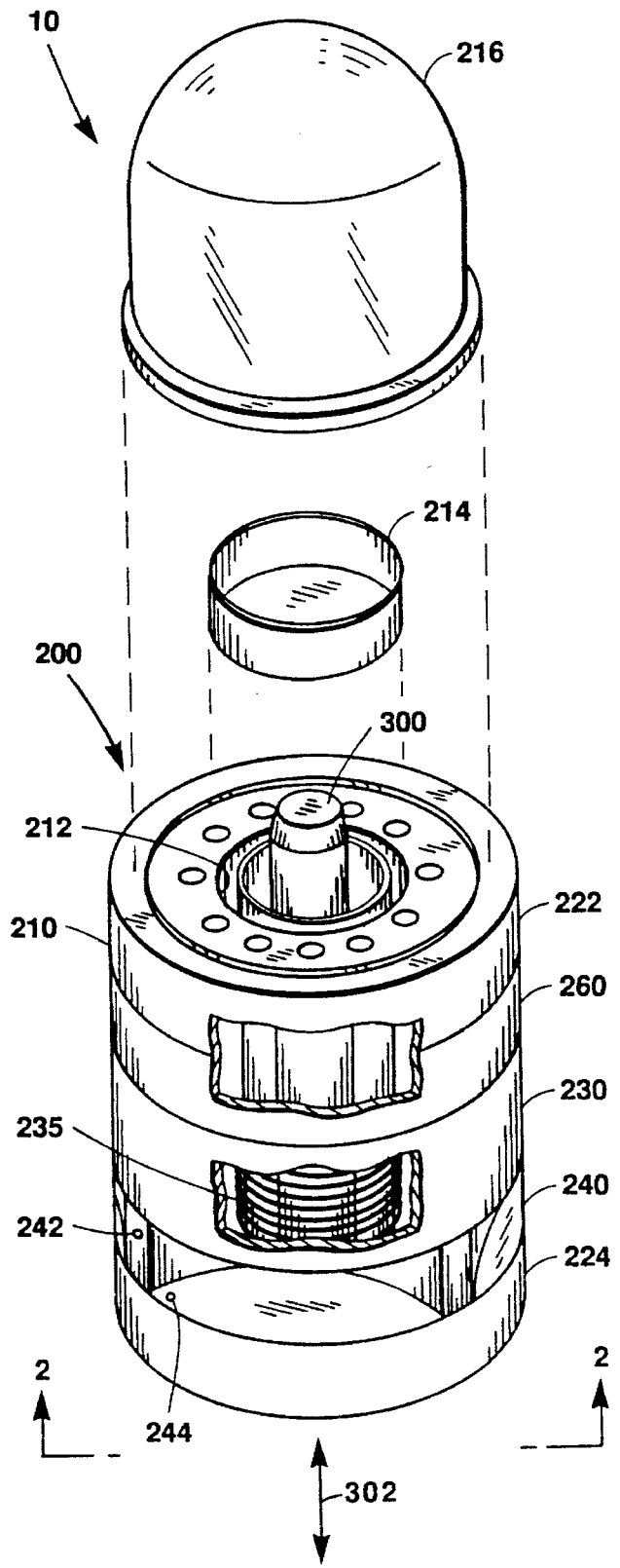
FIG. 1 is an isometric view of a magnetically-levitated force/weight measurement system in accordance with the invention.

FIG. 1 depicts an illustrative embodiment of a magnetically-levitated force/weight measurement system 10. A system core 200 comprises a plurality of layered circular segments, each of which has an aperture at its center, so as to define a cylinder 210 having an internal chamber 212. The segments include, inter alia, upper and lower magnetic bearing segments 222, 224, each of which contains a plurality of bearing magnets, and a coil segment 230 encompassing current-carrying solenoid coils 235. As described further herein, these segments interact to generate magnetic fields that levitate a spool 300 disposed within the chamber 212 of the system core 200.

Earnshaw's theorem applied to magnetic fields ensures that no body responsive only to a static gravitational and magnetic field can be in stable equilibrium. However, this principle does not exclude generation of a magnetic field and a mass responsive to it which may be levitated in a position that is generally equivalent to stable equilibrium. In accordance with the teachings of the invention, the system disclosed herein levitates a mass, i.e., spool 300, in a position of stable equilibrium except along a center axis 302 of the spool. A self-dampening feedback system 400 (FIG. 4) ensures that, upon displacement of the spool along that axis, the spool will be restored to the stable equilibrium position, thus obviating any detectable oscillations.

Figure 2:
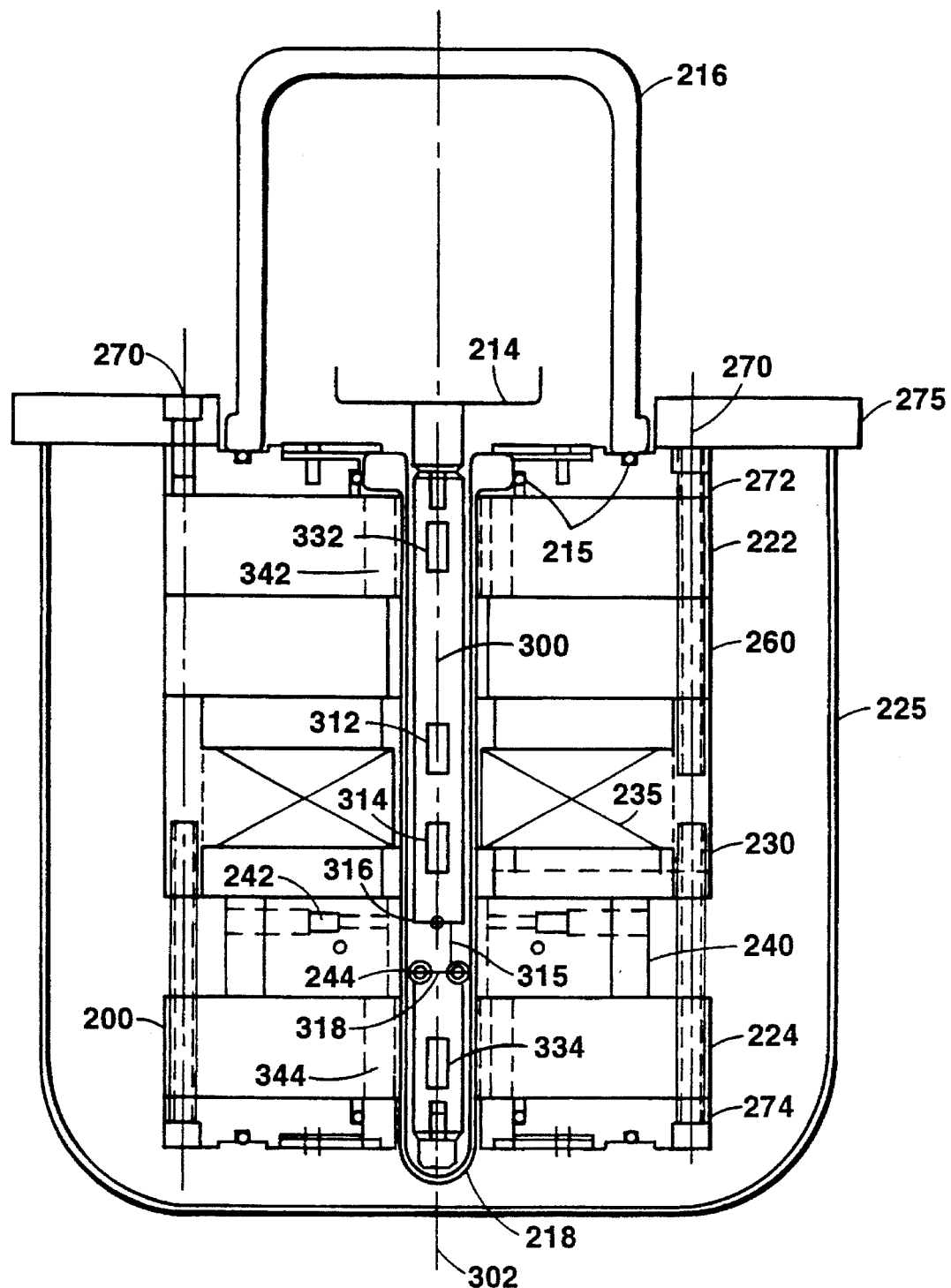
FIG. 2 is a cross-sectional view of a system core along lines 2—2 of the magnetically-levitated measurement system of FIG. 1.
Figure 3:
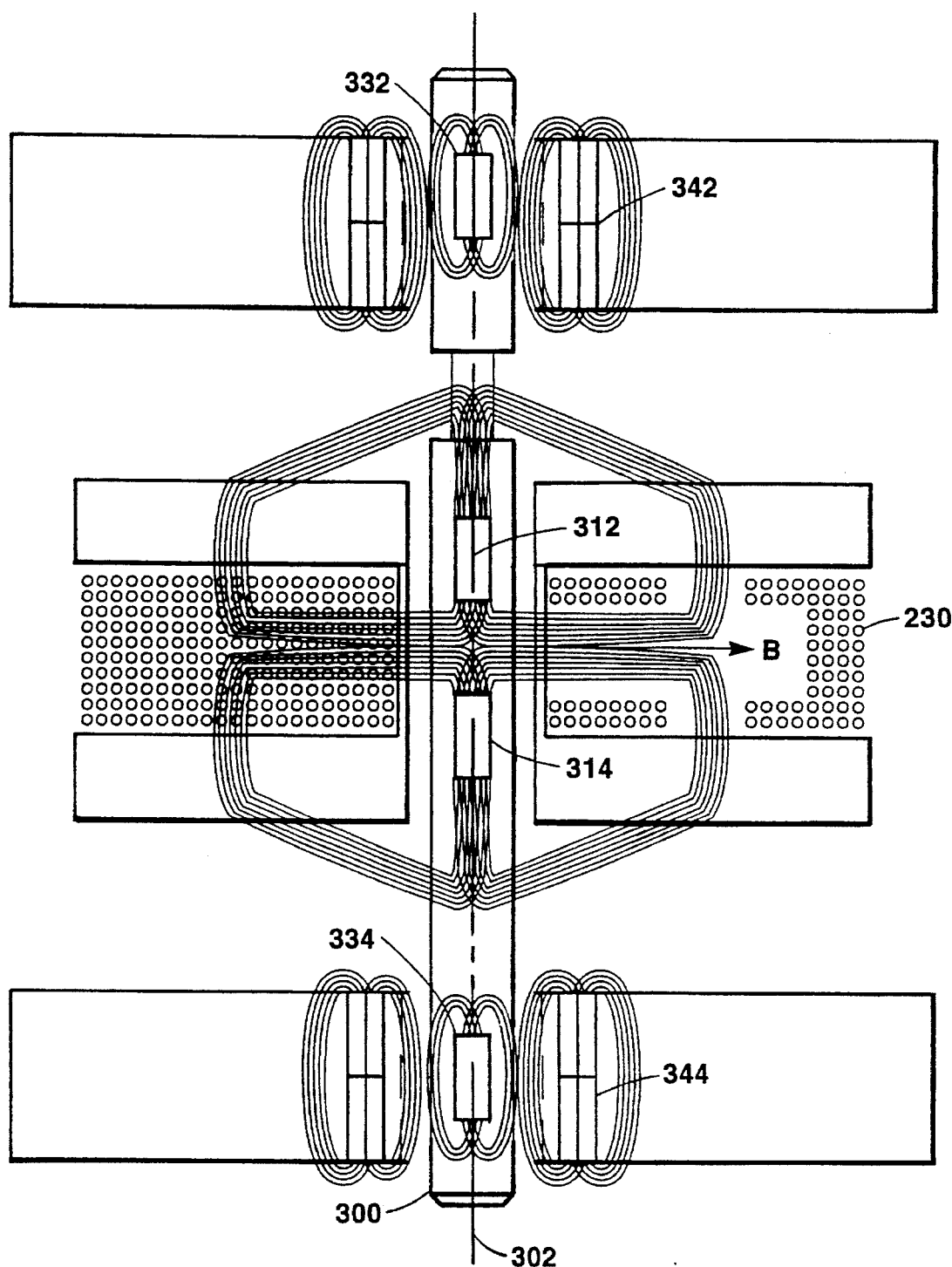
FIG. 3 is highly schematized diagram of a novel magnet arrangement configured to generate side fields in accordance with invention.

FIG. 2 depicts the components of system core 200. It should be noted that the elements of FIGS. 1–4 are somewhat exaggerated and are not drawn to scale for ease of depiction and ease of description. Specifically, no attempt has been made to depict the scale sizes of the optical, electrical and magnetic components associated with the system core 200, although the drawings depict their relationship relative to one another.

In addition to upper and lower magnetic bearing segments 222, 224, collectively referred to as segments 220, and coil segment 230, the core 200 also includes an optical segment 240 having optical detector mounting holes 242, 244, disposed therein and a spacer segment 260 for balancing the overall core segments. The core 200 is terminated by end plates 272, 274, and the entire unit is assembled using mounting screws 270. If necessary, system core 200 may be rigidly supported by mounting plate 275, also with the use of mounting screws 270.

Spool 300 is a mass preferably comprising coaxial members that are configured as an elongate cylinder and containing axially-positioned levitation magnets 312, 314 rigidly affixed within the center of the spool. The coaxial members are preferably composed of thermally conductive materials to eliminate thermal gradients across the magnets contained within the spool.

A groove 315, disposed around the perimeter of the cylinder, defines leading edge 316 and trailing edge 318 reference points around the spool. These references are used in conjunction with optical detectors and mounting holes 242, 244 to detect displacements of the spool, as described below in connection with FIG. 4.

A sample pan 214, attached to spool 300, receives objects for measurement. To protect the objects and spool from environmental disturbance and contamination, bell jar 216 is provided and may be sealed to a confinement tube 218 by ring gaskets 215. In operation, spool 300 is magnetically levitated within confinement tube 218. The accuracy of measurement operations of system core 200 is dependent on subtle variations in the magnetic fields and electric currents generated therein; accordingly, insulating shroud and magnetic shield 225 is provided to protect the system core from thermal and electromagnetic disturbance. The insulating shroud and magnetic shield 225 is preferably composed of a high permeability magnetic shielding material, i.e., "μ-metal", with an aluminum outer jacket.

In accordance with the invention, the levitation magnets are permanent magnetic dipoles rigidly disposed within spool 300 and are arranged such that similar magnetic poles are in facing relation, e.g., the north poles of each magnet face each other. This novel arrangement, shown in FIG. 3, produces a static magnetic "side" field that radiates symmetrically from the spool, while generating substantial forces directed along the center axis 302 of the spool in response to relatively small currents in solenoid coils 235. Preferably, there are approximately 1500 turns in the coils, although various other configurations of turns may be employed.

Specifically, assuming dF is an element of the force which the solenoid coils exert on the spool, then $$dF = IdL \times B,$$

where I is the current in a coil element having a length and direction dL, and B is the magnetic field produced by the levitation magnets 312, 314, collectively referred to at 310. Note that I is a scalar quantity, while the quantities dF, dL, and B are 3-dimensional vectors.

Because the two levitation magnets 310 are rigidly constrained in facing relation between like magnetic poles, the field B produced by these magnets is forced to radiate outward, symmetrically from the spool in a direction generally orthogonal to both the center axis 302 of the spool and to the current flowing in coils 235. That is, the side fields radiate as mushrooms, situated head-to-head, but somewhat flattened. It should be noted that the spacing between the levitation magnets is variable, i.e., these magnets may be spaced as far apart as a dipole length, as close together so as to be touching, or any distance therebetween.

Since the center axis of the spool is the only direction perpendicular to both the wires in the solenoid coils and the side field B produced by the levitation magnets 310, dF is directed along the center axis 302 of the spool. Accordingly, current flowing through the coils, in the presence of the levitation magnets, provides the axial force needed to levitate spool 300 along its center axis.

Referring also to FIG. 2, the spool 300 further contains axially-positioned bearing magnets 332, 334, collectively 330, rigidly affixed within each end of the spool. These magnets are preferably permanent magnetic dipoles that cooperate with core bearing magnets 342, 344, disposed within the upper and lower magnetic bearing segments 222, 224, respectively, to stabilize the spool in levitation in a plane transverse to the center axis 302. Specifically, the bearing magnets of each magnetic bearing segment are arranged in a radially symmetric manner around the chamber 212 of system core 200 so that the axes determined by their magnetic poles are parallel and radially-arrayed to the center axes 302 of system core 200 and spool 300. Preferably, there are twelve (12) bearing magnets per magnetic bearing segment disposed in each segment, although it will be apparent to those skilled in the art that fewer, or more, magnets may be employed.

Moreover, according to the invention, the core bearing magnets 342 in the upper segment 222 are disposed such that their polar axes are aligned in the same direction as the polar axis of the spool bearing magnet 332, while the polar axes of the core bearing magnets 344 of the lower segment 224 are aligned with the polar axis of spool bearing magnet 334. For example, the core bearing magnets 342 are arranged coaxial with spool 300 and have their north polar axes pointing in the same direction as the north polar axis of corresponding spool bearing magnet 332. This latter relationship also applies to the core bearing magnets 344 and corresponding spool bearing magnet 334.

Functionally, the core bearing magnets 342, 344 force their corresponding spool bearing magnets 332, 334 of spool 300 to seek a stable position in the center of confinement tube 218. Specifically, these bearing magnets position the spool in the transverse, i.e., horizontal, plane as a result of side field interactions. That is, the plurality of closely-aligned magnets disposed in rigid pole-to-pole facing relation create tight side fields that function as a cushion along the sides of the spool and interact to center the spool within the chamber. It should be noted that the positions of the bearing magnets within the magnetic bearing segments 220 may be adjusted to allow optimal centralization of spool 300.

As noted, solenoid coils 235 and levitation magnets 310 operate to stabilize the spool along its center axis 302. Such axial support of the spool is achieved in connection with optical position detectors mounted in optical block 240. Broadly stated, signals indicative of the position of spool 300 are generated by optical sensors, which are positioned in the orthogonal pair of optical detector mounting holes 242, 244, and processed by optical and current feedback system 400 to produce changes in the current in coils 235. The current/voltage variations are generally small and they function to ensure that spool 300 responds to any reasonable axial force by returning to the position it held before the application of that force.

Figure 4:
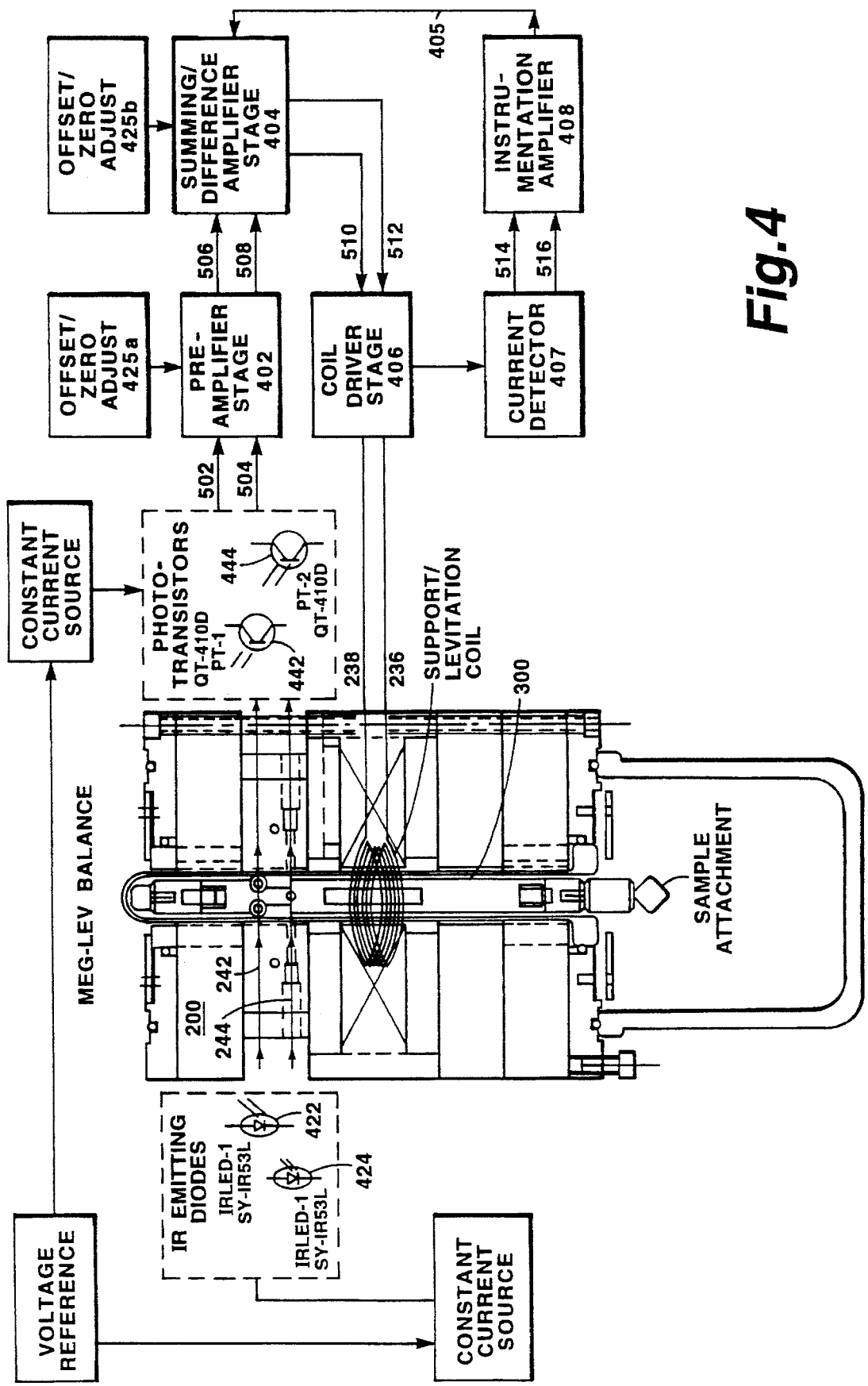
FIG. 4 is a schematic of an optical and current feedback detection system for the magnetically-levitated measurement system of FIG. 1.

FIG. 4 is a block diagram of the optical and current feedback circuit 400. In an illustrative embodiment of this circuit, solenoid coils 235 FIG. 2 comprise two sets of coils, shown at 236 and 238, wound to exert equal and opposite axial forces on spool 300 when supplied with equivalent amounts of current. These coils are configured to operate together, but typically at different times to maintain the spool in a stable axial position independent of forces applied to it. In another embodiment of the invention, a single coil may be used to exert the necessary axial forces on the spool. For this latter embodiment, the direction of current flow determines the direction of the force needed to restore the spool to the stable position. It will be apparent to those skilled in the art that other equivalent techniques may be used to "push" and "pull" the spool into stable equilibrium. Nevertheless, a feature of the invention is that system core 200 can be inverted or exposed to random accelerations without disrupting the stabilizing of spool 300, in part, due to the electromagnetic effect of these coils. This feature is particularly useful for field applications of the measurement system 10.

As noted, the function of circuit 400 is to maintain the spool in full levitation without detectable vibration or rotation, in part, by controlling the current flowing in solenoid coils 236, 238, collectively referred to as solenoid coils 235. The current flowing in coils 235 ensures that the centers of optical detector mounting holes 242, 244 align with leading edge 316 and trailing edge 318 of spool 300, respectively, to stabilize the spool in levitation at a position hereinafter called the central equilibrium position.

The optical detector mounting holes 242, 244 are preferably disposed orthogonally in optical block 240. Specifically, the distance between the centers of these holes is equal to the distance between leading edge 316 and trailing edge 318 of the spool. The optical detectors are preferably light-emitting diodes (LEDs), however other positional detectors may be used within the teachings of the invention.

LEDs 422, 424 are mounted at one end of the optical detector mounting holes, while phototransistors 442, 444 are mounted at opposing ends of the holes 242, 244. LEDs 422, 424 are identical and produce identical quantities of light. Accordingly, the light descends upon phototransistors 442, 444 from the LEDs at identical distances and under identical circumstances within optical detector mounting holes 242, 244, respectively. If one phototransistor receives more light than the other, the optical and current feedback system 400 adjusts the current in solenoid coils associated with the latter transistor, thereby forcing the spool into a position wherein its trailing and leading edges are aligned with the centers of the mounting holes, i.e., into the central equilibrium position.

Optical and current feedback circuit 400 includes a sensor preamp stage 402 comprising operational amplifier (op-amp) circuits for inverting and amplifying the signals generated by the phototransistors. These amplified optically-generated signals are provided as inputs to a differentiation and summation circuit stage 404 having op-amp circuits for summing each signal with the voltage potential at circuit node 405 of an instrumentational amplifier stage 408. The signals from the differentiation and summation stage 404 are passed as input signals to a coil driver stage 406, which includes at least one field effect transistor (FET) configured to drive current into either of the solenoid coils 236, 238.

Current flowing to either coil passes through resistor 407 to the ground. The potential across this resistor represents the inputs 514, 516 to instrumentation amplifier stage 408; this potential varies with the current flowing through coils and, further, is precisely indicative of that current. The instrumentation amplifier stage 408 inverts and filters the input signals, and thereafter feeds its output signal back as an input to differentiation and summation stage 404. The feedback signal is then added to the optically-derived signals, with the result determining the amount of current flowing to solenoid coils 236, 238. Differentiation and summation stage 404 further functions to attenuate the amount of current flowing through the coils in the event the current-derived signal indicates an excessive amount of current flow. Thus, the feedback signal from the instrumentation amplifier stage 408 smooths and dampens any oscillations that may be produced from a purely optically-driven feedback system, thereby also eliminating vibrations that typically accompany magnetic levitation of masses at room temperature.

Since the feedback signal from instrumentation amplifier stage 408, appearing at circuit node 405, is precisely indicative of the current flowing through solenoid coils 235, that feedback signal is also indicative of, and varies with, the axial force exerted on spool 300. A measurement of the feedback signal at circuit node 405 may be calibrated to render a precise measurement, preferably on a linear scale, of either a weight, acceleration, or gravity force applied to the spool in the axial direction. Since this "force" measurement is derived from a filtered signal, it is generally more "noise-free" than directly measuring the current in solenoid coils 235.

Mass offset networks 425a,b provide individually controllable input signals to the amplifier circuits in the sensor preamp stage 402 and in the differentiation and summation stage 404. These networks enable adjustment of the outputs of optical and current feedback system 400 to correct DC-offset values when commencing operation of the system core 200 to effect initial levitation of spool 300. The mass offset networks 425 also provide adjustment of the operating range for the magnetically levitated force/weight measurement system 10.

Operation of the magnetically levitated force/weight measurement system will now be described with reference to FIGS. 1–4. Upon removal of bell jar 216, a weight may be placed on sample pan 214 that exerts an axial force on spool 300 along its center axis 302, thereby depressing the spool. This movement is immediately detected by the optical sensors 442, 444 mounted in optical detector mounting holes 242, 244. For example, suppose the axial force displaces the spool such that leading edge 316 closes more than half of optical detector mounting hole 242, while trailing edge 318 opens more than half of optical detector mounting hole 244. As a result, phototransistor 442 receives less light from LED 422 than phototransistor 444 receives from LED 424, thereby changing the state of optical and current feedback system 400. Specifically, application of the axial force causes a decrease in resistance of phototransistor 442, a drop in potential across that transistor and a decrease in voltage to input 502 of sensor preamp stage 402. Simultaneously, there is an increase in resistance of, and an increase in potential across, phototransistor 444, and a corresponding increase in voltage to input 504.

Sensor preamp stage 402 inverts and amplifies input signals 502, 504, resulting in an amplified increase in potential at circuit node 506 and a correspondingly amplified decrease in potential at circuit node 508. The signals at these nodes are summed with the signal at circuit node 405 by the amplifiers of differentiation and summation stage 404. Circuit nodes 510, 512 experience an amplified increase and decrease, respectively, in potential independent of the potential at circuit node 405. The signal at circuit node 510 is passed to the gate of a FET within coil driver stage 406, which substantially increases the flow of current through coil 236, as the potential at circuit node 512 significantly decreases, i.e. "cuts-off", the current flow to coil 238 via another FET. The magnetic field created by these events forces spool 300 back into the central equilibrium position, counteracting the detected displacement by the weight. Phototransistors 442, 444 then resume receiving equivalent amounts of light.

Since the magnetic field produced by levitation magnets 310 is static, the counteracting force applied to the spool from solenoid coils 235 is directly proportional to, and varies linearly with, the current in these coils. Therefore, the current in the solenoid coils is precisely indicative of the applied weight in sample pan 214 and provides a linear measurement of that weight after calibration. This feature provides the basis for use of the invention as an accelerometer and as a gravity meter.

The system is entirely symmetric, so that if an axial force on spool 300 results in an increase of light to phototransistor 444 and a decrease of light to phototransistor 442, i.e., the reverse of the situation discussed above, circuits of the coil driver stage 406 will pass increased current to coil 238, while diminishing or cutting-off the current to coil 236. Again, this will force the spool into an equilibrium position.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A mass-levitating system, comprising:
   a mass containing means for generating a first magnetic field, the mass being in a stationary levitated position during equilibrium of said system;
   means for generating a second magnetic field, said second magnetic field generating means containing electric currents disposed in a manner that impinges on said first magnetic field to produce a force needed to levitate the mass;
   position detecting means for generating a signal indicative of a change in position of the mass; and
   signal processing means for transforming said signal into alterations in said electric currents, so as to restore the mass to said stationary position in response to said signal;
   wherein operation of said means for generating a first magnetic field and said means for generating a second magnetic field obviates the need for cryogenic temperatures.

2. The mass-levitating system of claim 1 further comprising, in response to an applied force on the mass, measurement means for converting said applied force into a measurement indicative of a magnitude of said force.

3. The mass-levitating system of claim 2 wherein the mass is constrained in levitation and detectably responsive to forces applied in only a single direction, said measurement means thereby producing a measurement of the magnitude of a single component of the forces and accelerations applied to the mass.

4. A mass-levitating system, comprising:
   first magnetic field generating means for generating a first magnetic field that levitates a mass along arm axis of the mass, the mass being in a stationary levitated position during equilibrium of said system;
   second magnetic field generating means for generating a second magnetic field that stabilizes the mass in..a plane transverse to said axis;
   position detecting means for generating a signal indicative of a change in position of the mass;
   signal processing means for transforming said signal into alterations in said first magnetic field so as to restore the mass to said stationary position in response to said signal, wherein the mass is radially symmetric about a central axis of said system and wherein said first magnetic field generating means expels said first magnetic field from a surface of the mass in a direction generally orthogonal to said central axis, said first magnetic field generating means comprising electric currents disposed orthogonally to said central axis and to said expelled magnetic field, thereby producing an axial force on the mass needed for levitation with minimal applied current: and
   magnetic bearing means, situated within said first and second magnetic field generating means, for generating magnetic fields that stabilize the mass relative to said central axis.

5. The mass-levitating system of claim 4 wherein said first magnetic field generating means comprises a pair of magnetic dipoles, said pair being coaxial with the mass and disposed in facing relation between like poles to thereby expel flux radiating from the mass in a direction that is generally orthogonal to said central axis.

6. A device for measuring force and acceleration, said device comprising:

a housing with a central axis;

a mass radially symmetric about said central axis, said mass containing first means to generate a magnetic field which leaves the surface of said mass in a direction generally orthogonal and radial to said central axis, said mass having an operating position coaxial with said central axis and levitated within said housing;

second means for generating a magnetic field, said second means disposed in a radially symmetric manner around said central axis and containing conducting means arranged orthogonal both to the magnetic field generated by said first means and to said central axis, thereby rendering maximal axial force on said mass when a current is passed through said conducting means;

position detecting means for generating a signal indicative of the position of said mass;

feedback means for converting said signal into a current in said conducting means to provide the force on said mass needed to maintain the axial component of said mass in said operating position;

secondary feedback means for preventing oscillations in said feedback means, thereby levitating said mass without positional oscillation in said operating position;

magnetic bearing means within said first and second means for producing magnetic fields that coaxially align said mass with said central axis, and measurement means for converting the response of said feedback means to a force applied to said mass into a measurement of the magnitude of that force, the operation of said device not requiring cryogenic temperatures.

7. The device of claim 6 wherein said first means includes a pair of magnetic dipoles disposed coaxially along a said central axis and arranged in facing relation between like poles.

8. The device of claim 7 wherein said second means comprises a plurality of solenoid coils wound so as to exert oppositely directed forces on said mass when passing current from said feedback means to thereby render levitation of said mass in said operating position axially stable symmetrically in both directions.

9. The device of claim 8 wherein said magnetic bearing means comprises a plurality of dipoles, each having a polar axis parallel to said central axis and at an adjustable distance from said central axis.

10. The device of claim 8 wherein said magnetic bearing means comprises a plurality of dipoles having polar axes parallel to said central axis and disposed so as to force said pair of magnetic dipoles of said mass to be coaxial with said central axis.

11. The device of claim 10 wherein said position detecting means employs optical means for passing light to a light sensitive means, said light sensitive means producing a signal indicative of a change in the amount of light received as a result of the movement of said mass, said signal therefore also being indicative of the movement of said mass.

* * * * *